Jan. 30, 1968 C. J. FITCH 3,366,043

FLUID PRESSURE-ACTUATED SENSING AND RECORDING DEVICES

Filed June 18, 1964 3 Sheets-Sheet 1

INVENTORS
CLYDE J. FITCH
BY K. P. Johnson
ATTORNEY

Jan. 30, 1968 C. J. FITCH 3,366,043

FLUID PRESSURE-ACTUATED SENSING AND RECORDING DEVICES

Filed June 18, 1964 3 Sheets-Sheet 3

3,366,043

FLUID PRESSURE-ACTUATED SENSING AND RECORDING DEVICES

Clyde J. Fitch, Endicott, N.Y., assignor to International Business Machines Corporation, New York, N.Y., a corporation of New York Filed June 18, 1964, Ser. No. 376,189
8 Claims. (Cl. 101—93)

ABSTRACT OF THE DISCLOSURE

Apparatus for translating coded information in a record member into alphabetical and numeric characters by fluid pressure-actuated sensing and recording devices.

As is well known, information is often stored in a record member by a hole punched therein in accordance with a predetermined code. Although the punched holes may be easily read and processed by machines, it is often necessary and highly desirable at times to translate the coded information into human-readable language. There have been developed for this purpose various machines which sense the record and control positioning of recording elements to print the character represented by the perforations. These machines generally employ brushes or photocells as sensing elements and require electrical circuits in conjunction with cyclic complex mechanisms to accomplish the translation and recording functions. Because of this, the machines have the inherent disadvantages of complexity, high manufacturing cost, and a large number of moving parts subject to wear and failure.

Upon occasion it also becomes necessary to expand the number of code permutations to be translated. The known devices have either fixed physical limitations or cannot be easily altered to interpret an expanded code.

Translators heretofore known usually require critical timing relations between the record and recording mechanisms because of their cyclic operation. When the record is not fed or transported in synchronism with machine generated timing impulses, erroneous recording occurs. As a result the feeeding and transport mechanisms are intricately constructed and costly, and detection devices are incorporated to provide an alert to the misfeed condition.

Accordingly, a primary object of this invention is to provide translating and recording apparatus of simplified, inexpensive design having improved reliability.

Another important object is to provide translating and recording apparatus which is asynchronous in operation that eliminates the necessity of critical timing relationships between the mechanism and a record member.

Another object of this invention is to provide translating and recording mechanisms of modular design which can be easily altered in accordance with the number of code permutations which are to be recognized.

Still another object of this invention is to provide translating and recording apparatus which utilizes fluid for translating coded permutations and for actuating a recording means.

Another object of this invention is to provide translating and recording apparatus which randomly decodes a record member and is adapted to handle record members of variable length.

In accordance with the foregoing objects, the invention provides translating and recording apparatus comprising a plurality of decoding modules each responsive to a predetermined arrangement of perforations in a record member for actuating control means and recording means connected therewith. Each module has a plurality of fluid-conveying ducts formed therein which communicate with a decoding surface on the module that receives a record member. Certain of the ducts are arranged to be connected together serially by a perforation coinciding with the surface area in which the ducts terminate. Selected ones of the ducts are also formed with a venting junction which communicates with other areas of the surface so that the presence of the record perforation at those areas permits the fluid in the ducts to be vented to atmosphere and thus render the decoding module ineffective to convey fluid to the recording control means. Means are provided to pass record members serially over the recording surface and over each module successively. In this manner each column of perforations in the record member is scanned by each module and those columns having perforations only at locations where the duct path is continuous will cause the module to actuate its control means and its recording means. Opposite the decoding surfaces of the modules there are provided means forming a support surface for the record members to prevent the flow of fluid through the perforations except at those locations where the aforementioned venting junctions appear. In this manner the desired perforations effect a continuous duct so that fluid flow is established from a source to the control means.

The translating apparatus has the feature of using movable second surface means cooperating with the decoding surfaces and ducts of the modules to block fluid flow in the absence of a record member so that fluid leakage is minimized. The ducts of the modules are all arranged on one side of the record member so that the problem of critical alignment between the fluid issuing and receiving ducts is avoided. This arrangement further prevents false readings when no record members are present within the translating apparatus. Because of the modular construction in the apparatus the decoding modules for such characters as desired may be easily added to or eliminated from the apparatus.

The foregoing and other objects, features and advantages of the invention will be apparent from the following more particuar description of the preferred embodiment of the invention as illustrated in the accompanying drawings wherein.

Figure 1:
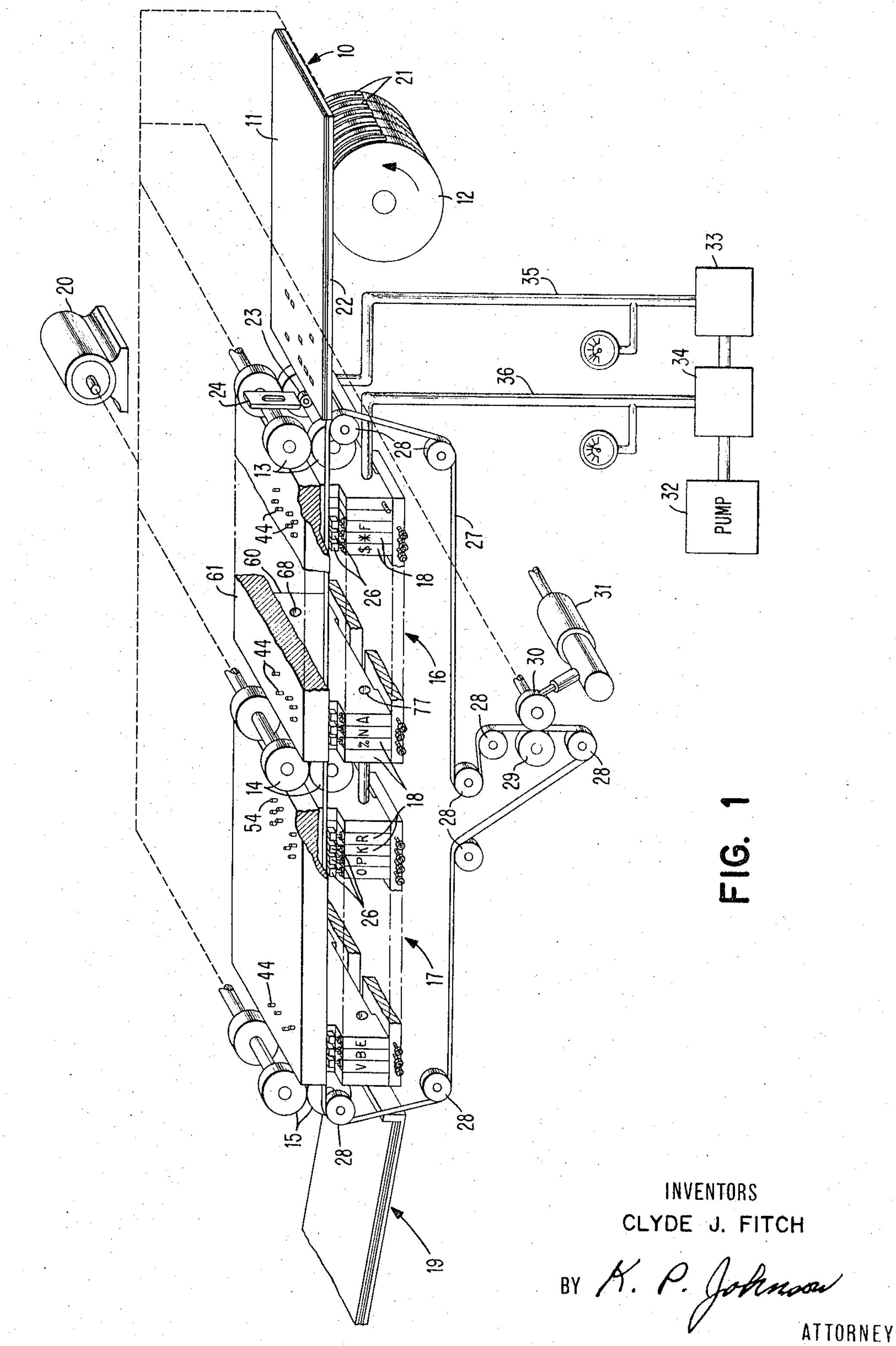
FIGURE 1 is a perspective view of the translating apparatus of the invention showing the decoding modules and transport mechanism therefor.

Referring now to FIG. 1, there is shown the translating and recording apparatus of the invention which comprises generally a hopper 10 for receiving a stack of perforated record documents 11, a friction feeding drum 12, feed roll pairs 13, 14 and 15 for transporting the documents, a first and second plurality 16 and 17 of decoding and recording modules 18 and a stacker pocket 19 for receiving the interpreted documents. The drum and feed roll pairs may be driven by a motor 20 through any suitable mechanical coupling indicated by the broken lines.

The documents are fed from hopper 10 by rotating drum 12 which has a plurality of short strips 21 of high-friction material such as chlorosulfonated polyethylene embedded therein to extend slightly above the drum periphery. The surface of the strips extends above bed plate 22 sufficiently to engage the bottom document in the stack and slide it to the left between roller 23 and throat block 24. A spacing between the roller and throat block is adjusted to permit only a single document to pass. Since the translating apparatus is asynchronous in operation, strips 21 are present on only a minor portion of the drum periphery and are positioned to engage the document between the rows of perforations therein to prevent damage of the document. There is no critical timing of feed operation, and therefore it is only necessary that documents 11 follow successively between the roller and throat block at the rate of one document per revolution of drum 12.

As the documents pass the throat block, moving to the left, they are gripped by feed rollers 13 and driven through the decoding slot of modules 18 of plurality 16. Upon emerging from the plurality 16 of modules, the card is gripped by feed rolls 14 the process repeated for module plurality 17 whereupon feed rolls 15 drive the documents into stacker 19. The decoding modules 18 are divided into two pluralities to permit feed rolls 14 to be interposed between rolls 13 and 15 in the event that the documents being processed are too short to extend between the latter feed rolls.

As a document passes through the decoding slots of the modules, each module senses each card column for a particular arrangement of perforations therein. For purposes of explanation, it is assumed that the documents being decoded are tabulating cards each containing eighty data columns with each column having 12 index positions, any of which can contain a perforation. When one of the modules 18 senses its unique columnar arrangement of perforations it responds by the actuation of a print piston (not shown) which drives a print hammer 26 upward against ink ribbon 27, leaving an impression for that card column along the top margin of the card. This hammer 26 has a character engraved on its top surface which corresponds to the perforation arrangement of the document and is of rectangular cross-section to prevent rotation during operation. Ink ribbon 27 is supported on freely rotatable idler pulleys 28 and is driven along its path by rubber and steel pinch rolls 29 and 30, respectively. Roll 30 is driven through a suitable coupling to the mechanical drive of the apparatus. In this embodiment ribbon 27 is an endless loop, and reinking is accomplished by inking roll 30 from the wick of an inking capsule 31. It is to be noted that any conventional inking ribbon and drive may be used with the invention.

The translation of a columnar arrangement of perforations into the printed characters is accomplished by sensing the presence and absence of holes with a pressurized fluid. The fluid is supplied from a conventional pump 32 which supplies air as the fluid to pressure reducing valves 33 and 34. The air from valve 34 is at a high pressure, approximately 8 p.s.i.g. and the air from valve 33 is at a lower pressure preferably 3 p.s.i.g. The air is supplied through suitable respective ducts 36 and 35 to the decoding modules 18.

Figure 2:
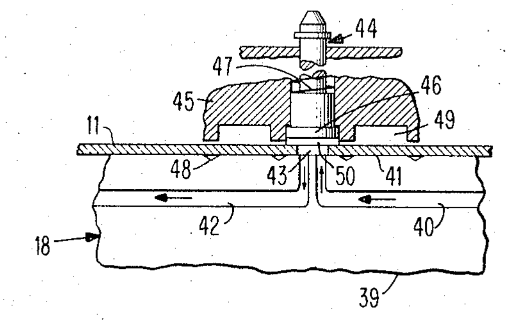
FIGURE 2 is a partial elevation view of the arrangement of a pair of ducts in a decoding module illustrating how a document perforation serves to join the two ducts.

As a document 11 proceeds over the decoding modules 18, each module senses each column of index positions for the arrangement of perforations unique to that module. If the arrangement is present, the character is printed on the document. Decoding is accomplished by attempting to pass a fluid pressure signal serially through a plurality of fluid-conveying ducts in each module. A pair of serially arranged ducts is shown in FIG. 2. Duct 40 in code plate 39 is connected to a source of pressurized fluid such as duct 35 (FIG. 1) so that fluid flow is in the direction of the arrow. The downstream end of the duct terminates at an area of decoding surface 41 of the module corresponding to a document index position which is to be sensed. A second duct 42 also has one end terminating at substantially the same area of surface adjacent duct 40, but not connected thereto. The ducts are of a size such that the two ends can be encompassed by a single perforation 43 in document 11. When a perforation is encountered as the document moves (into and normal to the paper), fluid flowing in duct 40 is guided into duct 42. The arrangement of ducts 40 and 42 thus forms a junction connectible by a perforation and the perforation is effective to become a duct in itself.

In order to hold the document against decoding surface 41 and prevent fluid flow from the top surface of the document, a movable pressure pin 44 located in upper plate portion 45 is provided opposite the connectible junction of the ducts 40 and 42. The pressure pin has an enlarged base portion 46, impervious to fluid, and is larger than the perforation by an amount sufficient to cover the perforation within its limits of tolerance. The pressure pin is urged downward by spring 47 against top surface of document 11 to thereby form a duct of the perforation. Pressure pin 44 is also movable down to the surface 41 when no document is present. The purpose of this movement is to block fluid issuing from duct 40 when no record member is present on decoding surface 41 in order to conserve fluid.

It will be noted in FIG. 2 that the code plate 39 is provided with grooves 48. The purpose of the grooves is to prevent a static pressure build-up of fluid under the document which leaks out from duct 40. These grooves lead directly to atmosphere so that any fluid may be lead off immediately. Grooves 49 in upper plate portion 45 are provided to accommodate pins 44 for index positions where necessary in adjacent code plates. The bottom portion 46 of pressure pin 44 has a beveled edge 50 formed thereon so that an incoming document may force the pin upward to the position shown. The pressure pin may be held in upper plate portion 45 by a spring clip or enlargement to facilitate assembly.

The arrangement of perforations within the document column depends upon the code employed for the character which the perforations are to represent. Thus, a character may be represented by a single perforation in any one of the index positions or by perforations in a combination of index positions. Each decoding module 18 must have the ability to discriminate between combinations of perforations and respond only to one perforation arrangement within a column. In order to accomplish this, a venting junction is provided in series with the connectible junctions of FIG. 2 as required in a decoding module.

Figure 3:
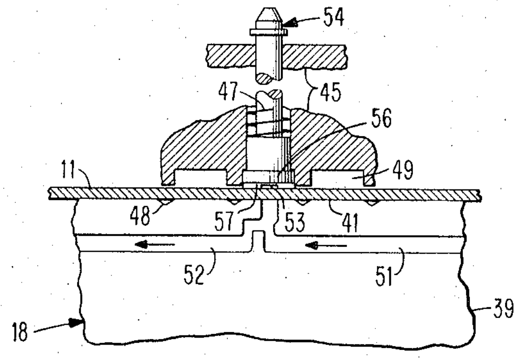
FIGURE 3 is a partial elevation view of a venting junction of ducts in a decoding module which is operable to render flow through the ducts ineffective.

Such a venting junction is illustrated in FIG. 3. The purpose of the junction is to lead off or vent pressurized fluid present in a duct so that following ducts do not receive a sufficient amount of fluid therein to actuate subsequent control and recording means. In the figure, it may be assumed that fluid under pressure is being conveyed by duct 51 in the direction of the arrow. This duct terminates at decoding surface 41 corresponding to one of the index positions in document 11. Joining duct 51 at substantially right angles thereto to form a T junction and below decoding surface 41 is a second duct 52 through which the pressurized fluid is led to another index position or a subsequent control valve. If there is no hole present at the termination of duct 51, fluid flow will be directed as a result into duct 52. If, however, there is a perforation at the index position fluid will continue upward through the perforation in the document and out through groove 53 in sensing pin 54. Because of the substantially perpendicular junction between ducts 51 and 52, and the enlarged cross-sectional area of the duct that allows expansion of the air when it passes through a hole in the document, little or no fluid will flow into duct 52 and the fluid in duct 51 will be vented to the atmosphere. The venting junction thus uses the Bernoulli effect to prevent flow in the succeeding duct. Pressure pin 54 is also biased downward by spring 47 in the upper plate portion 45 of module 18 so that it presses document 11 against decoding surface 41. Pressure pin 54 is also urged against surface 41 when no document is present. However, because of groove 53 therein, pin 54 is not effective to block the flow in duct 51. This is necessary in order to avoid a possible false indication when no documents are present in decoding module 18. The base portion 56 of the pressure pin also has a beveled edge 57 which is engaged by an incoming document to force the pin upward.

At this point it may be seen from FIGS. 2 and 3 that there are provided connectible junctions by which two ducts may be joined by a perforation and venting junctions by which fluid may be prevented from flowing successively from one duct to another when there is a perforation. By appropriately locating one junction or the other at the desired index positions of decoding surface 41, each decoding module 18 may be made to respond to only one of many possible combinations of perforations in a column.

Figure 4:
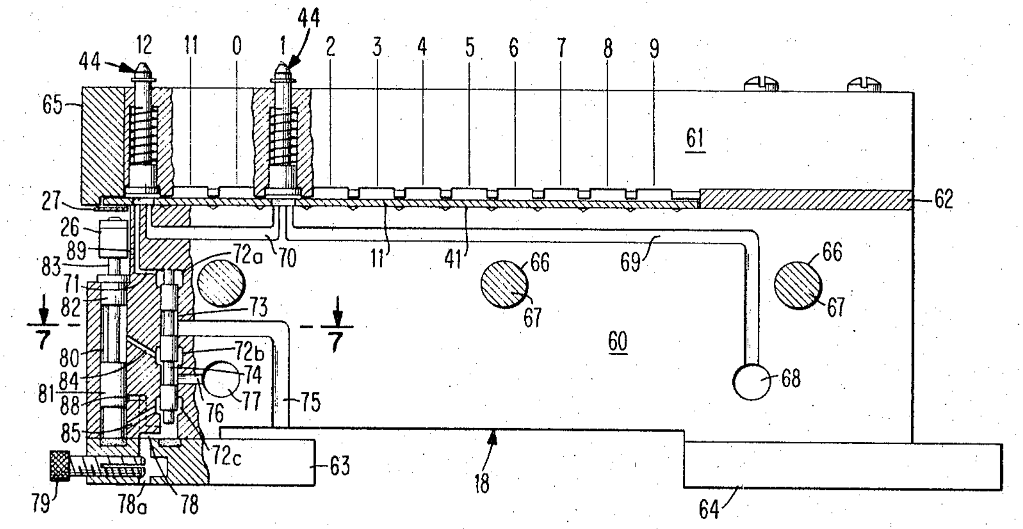
FIGURE 4 is an elevation view of one of the decoding modules used in the translating apparatus and shows one example of the duct arrangement for the character "A" in the Hollerith code and further illustrates the control valve and recording mechanism used with the module.

An example of a decoding module 18 is shown in FIG. 4. Each module comprises generally a code plate 60. A common upper plate 61 is secured to the code plates as by screws with a separator and guide strip 62 therebetween. The guide strip is common to all modules in a plurality such as 16 in FIG. 1, and provides a channel between plates 60 and 61 to each module in which a document is moved during the translating process. Base strips 63 and 64 are secured to the bottom of code plate 60 and also are common to all modules in a plurality. Platen 65, attached to upper plate 61, is common to all modules and provides a surface against which the document and ribbon are driven during printing.

The code plates of each module are of sufficient thickness to permit mounting pressure pins 44 or 54 in the upper plate and to permit the formation of the control valve and printing piston chambers, and ducts in each code plate. Each code plate also has formed therein three holes 66 which are in common alignment and through which extend tie rods 67 to hold a plurality of code plates tightly together.

Each duct plate is provided with a hole 68 in common alignment to serve as a manifold for low pressure air supplied via duct 35 in FIG. 1. A duct 69 is formed in the surface of each plate connecting hole 68 with one of the index positions for which that particular plate is to respond to the columnar arrangement of perforations. In FIG. 4, duct 69 communicates with the area of decoding surface 41 corresponding to index position "1." In this example the code plate is to sense the document column for the presence of "12" and "1" perforations which represent a character "A" in the Hollerith code. Such documents are fed face down with the 12 edge to the left. Therefore, a connectible junction is formed at the "1" index position and at the "12" index position. Thus, a second duct 70 is provided with an end terminating at each index position. A third duct 71 completes the "12" connectible junction and further terminates at the top port of control valve chamber 73. Thus, when a card column is present between plates 60 and 61 with perforations at the "1" and "12" index positions, pressure pins 44 will be present on top of the document covering the perforations therein and fluid under pressure from manifold 68 will be guided through ducts 69, 70 and 71 to initiate the recording of the character "A."

Each code plate 60 has formed therein a chamber 73 in which is positioned a spool valve 74 having three lands formed thereon. The valve chamber is provided with three full annulus ports 72*a*, 72*b* and 72*c* so that the fluid pressure forces are radially balanced about the spool valve permitting the valve to ride on a film of fluid. A duct 75 is provided between ports 72*a* and 72*b* which communicates to the atmosphere. Between ports 72*b* and 72*c* is duct 76 which communicates with hole 77 that is, in turn, connected with the commonly aligned holes of the other code plates connected to high-pressure duct 36 of FIG. 1. Spool valve chamber 73 is closed at the bottom thereof by plate 63 and has a channel 78 that communicates with the atmosphere through port 78*a* in plate 63. An adjustable screw 79 is threadedly inserted in plate 63 and the adjustment thereof is used to vary the restriction in exhaust channel 78*a*.

At the left of the spool valve chamber in FIG. 4 there is a chamber 80 closed at the top by bushing 82 and at the bottom by plate 63. A print piston 81 in chamber 80 has fixed thereto to shaft 83 to which is secured print hammer 26 having the character "A" engraved at the top surface thereof. A duct 84 communicates with annular port 72*b* and chamber 80 above the upper limit of travel of print piston 81. Another duct 85 communicates with annular port 72*c* and chamber 80 below the extreme travel of print piston 81. Print piston 81 is formed with a smaller diameter extension underneath which serves to limit the downward travel of the piston. Both the piston and spool valve when moved downward contact a resilient material such as a rubber-cork composition to reduce bounce.

When the spool valve is in the static position as shown, the high pressure fluid from hole 77 exerts both an upward and downward force against the center and bottom lands of the valve and is effective through channel 84 to urge print piston 81 downward. The valve lands are each slightly smaller than the chamber diameter so that the high pressure fluid leaks past each of the lands. When the high pressure fluid passes upward, it exhausts to atmosphere through channel 75 and exerts no axial force on the spool. The fluid that leaks downward exhausts also to atmosphere through channels 78 and 78*a*. However, screw 79 is adjusted to restrict duct 78*a* so that a pressure higher than atmospheric exists under the bottom land. This causes spool valve 74 to be maintained upward in the position shown. The high pressure from duct 84 urges print piston 81 down and fluid beneath the piston exhausts to atmosphere via duct 85, port 72*c* and ducts 78 and 78*a*.

When a proper arrangement of holes is sensed as indicated by fluid flow from manifold 68 through ducts 69, 70 and 71, the pressure is sufficient to drive spool valve 74 down thereby venting the cavity above piston 81 to asmosphere via duct 84, port 72*b* and duct 75. The high-pressure fluid from manifold 77 and duct 76 is then applied through duct 85 to the bottom of print piston 81 forcing the piston and print hammer 26 upward against ribbon 27 and the edge of document 11 to record the character on the top margin of the document for the column sensed.

When the print piston 81 moves upward approximately half its distance, it exposes a feedback duct 88 which connects with duct 78 so that the high pressure fluid below the piston is returned to duct 78 to increase the pressure under the spool valve forcing it to return to the position shown. The movement of the spool valve again supplies high-pressure fluid through duct 76, port 72*b* and duct 84 to the cavity above the print piston to force the latter downward. At this time the control valve and print piston have been returned to the position shown and are ready to be actuated again by a fluid pressure signal in the sensing channels. The sensing and printing occur while the document is in motion. It will be noted in FIG. 4 that a small direct vent 89 is provided for duct 71 which leads to atmosphere adjacent the print hammer 26. The purpose of the vent is to prevent static pressure build-up above the spool valve which would cause possible erratic operation.

Figure 5:
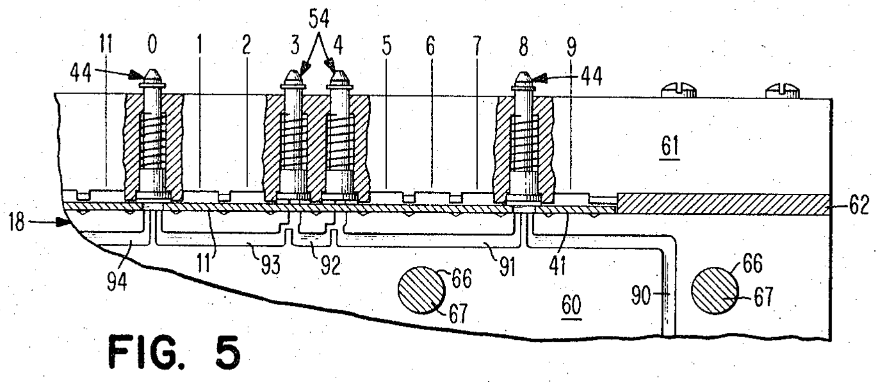
FIGURE 5 is a partial elevation view of another module showing the duct arrangement for the character "Y" in the Hollerith code.

FIG. 5 shows the duct configuration in a code plate for sensing the columnar arrangement of perforations for the character "Y." This code plate requires the corporation of two venting junctions, as described with reference to FIG. 3, because of other combinations of perforations which also include the perforations representative of the "Y." The "Y" in the Hollerith code is represented by perforations in the "0" and "8" index positions while the comma and percent symbol are represented by perforations in the "0," "3," "8" and "0," "4," "8" index positions, respectively. In the figure the right end duct 90 is connected to the low pressure fluid manifold such as a hole 68 described in FIG. 4, and the left end of the duct terminates at the "8" index position of decoding surface 41. The right end of the following duct 91 also terminates at the "8" position while the left end of the duct terminates at the "4" position. Duct 92, however, joins duct 91 at substantially right angles below the decoding surface so that the "4" index position is provided with a venting junction. The "3" index position is also provided with a venting junction by duct 93 joining duct 92. The left end of duct 93 terminates at the "0" index position as does the succeeding duct 94. The left end of duct 94 leads to the spool valve chamber which is not shown in FIG. 5.

With the arrangement of FIG. 5, a low pressure fluid signal will reach duct 94 only when perforations occur at the "8" index position to join ducts 90 and 91 and at the "0" index position to join ducts 93 and 94. If, however, a perforation occurs at either the "3" or "4" index positions, pressurized fluid present in ducts 91 or 92 will be vented to asmosphere through the perforations and the grooves in the base portions of pressure pins 54. This will present the "Y" code plate from responding to any except the perforation arrangement peculiar to that character. Similarly, if there is no perforation at either the "8" or "0" index positions, the pressurized fluid cannot reach the respective ducts 91 or 94.

Figure 6:
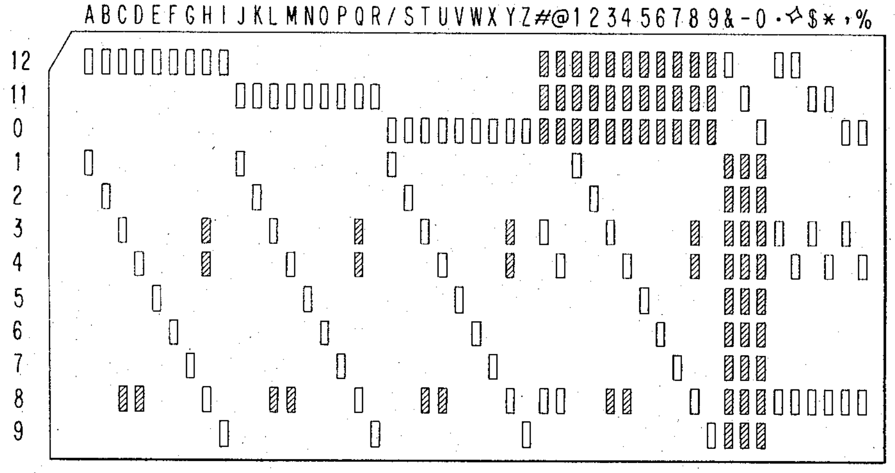
FIGURE 6 shows the arrangement of connectible junctions of FIG. 2 and venting junctions of FIG. 3 as they are required to be combined in each document column to decode the perforations therein and record the characters illustrated at the top of the figure.

In FIG. 6 there is shown the combinations of connectible and venting junctions required for each character when punched in a record member according to the Hollerith code. The index positions in which the two types of junctions are to appear are noted at the left margin of the diagram and the characters represented by particular code combinations or perforations are noted at the top of the figure. The open rectangles indicate the index positions in which connectible junctions are located in the code plates and also the perforations in a column which represent the character. The cross-hatched rectangles indicate the locations in which venting junctions are to be formed in a code plate so that the code plate will not respond erroneously to another character code. For example, the character C is represented by holes in the "12" and "13" index positions. However, the period is represented by perforations in the "12," "3" and "8" index positions so that without a venting junction in the "8" position of the "C" code plate, the latter would respond erroneously when the code for a period appeared in the document. As a further example, it will be noted that the code plates for the numerals "1" through "9" each have venting junctions in the "12," "11" and "0" index positions, because the presence of a perforation in one of these positions in combination with an index position representing a numeral is the code for alphabetic character. At this point it can be seen that each code plate may be made to respond to a unique combination of perforations in a record member by the proper combination of connectible and venting junctions. Because of this, the translating and recording apparatus described above can be used with codes other than the Hollerith code and with codes having different numbers of index positions in a document.

Figure 7:
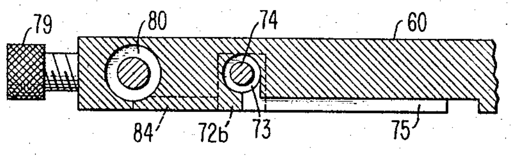
FIGURE 7 is a cross-sectional view taken along the line 7—7 of FIG. 4.

Each module 18 is a self-contained decoding and recording unit. As stated above, the code plates are of a thickness, which is that necessary to accommodate the piston and spool valve chambers. As seen in FIG. 7, each of these chambers may be formed by drilling through the bottom of the code plate. The full annulus ports 72*a*, 72*b* and 72*c*, and the ducts may be formed by milling the surface shown in FIG. 4. Duct 88 requires milling on the front of the code plate and drilling on the front and bottom to connect the duct to duct 78. Ducts 75, 76 are each cut to a depth necessary to communicate with the spool valve chamber. When the decoding modules 18 are assembled on the tie rods 67 to form a plurality, the rear surface of one code plate serves as a cover to fully enclose the ducts formed in the front surface of an adjacent code plate. The openings as shown in FIG. 4 are thus enclosed when the decoding modules are assembled. Blank code plates may be used to seal the ends of each plurality.

It may be noted that when the punched document being decoded is relatively thin, such as paper tape, the thickness of the document may be such that an insufficient amount of fluid can pass from one to the other of the ducts at a connectible junction due to the restriction caused by the record thickness. In such case, the base portions of the pressure pins 44 may be formed with a cavity or dimple therein to pass a larger quantity of fluid. The dimple should be kept to a minimum size in order to prevent imperforate portions of the document from being raised sufficiently to permit a false signal at the junction.

Although a preferred embodiment of the invention has been shown and described, the apparatus can be modified by replacing the assembly of pressure pins 44 and 54 and the upper plate (FIGS. 2 and 3) with only a plate serving as the upper support surface for the documents. In this case, holes are provided in the locations opposite the venting junctions to permit the escape of fluid to the atmosphere. Such a plate, however, permits greater leakage of fluid when there are no documents present in the modules. Pluralities of modules may be varied in size and number in accordance with the number of characters to be sensed and the length of the documents to be processed. For example, if the characters to be decoded are only alphabetic or only numeric, a single grouping of modules would probably be possible.

Particular decoding applications may require that the translated data be recorded on another document remote from the translating apparatus. Therefore, the printing apparatus may be located remotely from the translating apparatus and be connected by suitable ducts. Furthermore, the spool valves of the modules may be used to operate switches and thereby control recording apparatus electrically.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for translating and recording information represented by perforations in a record member comprising, in combination:

means for recording information;

control means operable in response to fluid flow for actuating said recording means;

decoding means including an element having formed therein a plurality of ducts each adapted to convey fluid therethrough when connected, a first of said ducts having one end thereof terminating at a predetermined surface area of said element and a second of said ducts having one end thereof terminating at said surface area adjacent said end of said first duct so both said ends are capable of being encompassed by a said perforation;

means forming a second surface impervious to said fluid and spaced from said element surface a distance equal to the thickness of said member for preventing fluid flow through said perforations; and means for moving said member between said first and second surfaces whereby when a perforation coincides with said first surface area, said member and said second surface forming an interconnection between said one ends of said first and second ducts to permit fluid flow therebetween for operating said control means.

2. In a device for translating and recording characters of a known group in which each character is represented by a unique arrangement of columnar perforations in a record member, apparatus comprising:

an element having a decoding surface thereon for receiving said member and a plurality of ducts therein, said ducts being arranged to convey fluid successively therethrough from a source when connected, with at least a pair of said ducts each having one end thereof terminating at a first predetermined area of said surface and adapted to be connected by a said perforation at said area, and another duct forming a junction with one of said pair substantially normal thereto so that said junction terminates at a second predetermined area of said surface and is adapted to vent fluid from said duct plurality by a said perforation at said second area;

means forming a surface opposite said decoding surface to prevent fluid flow through a said perforation at said first area and to permit fluid flow through a said perforation at said second area; and valve means connected to said duct plurality for providing an output signal in response to fluid flow through said duct plurality.

3. Apparatus for translating and recording characters in a known group in which said characters are each represented by a unique arrangement of perforations at selected ones of designated areas located in a column in a record member comprising, in combination:

a plurality of recording means each operable in response to a fluid pressure signal for recording a different one of said characters;

a plurality of decoding elements each responsive to one of said columnar arrangements of perforations for enabling a said fluid pressure signal for operating one of said recording means, each of said elements including a first surface and a plurality of fluid-conveying ducts therein with at least one end of each of two of said ducts terminating at said first surface at predetermined areas thereof to form a single continuous duct in cooperation with the perforations of a record member thereon, and selected ones of said elements including a junction of ducts therein for rendering said continuous duct effectively discontinuous when a said perforation occurs at certain others of said areas;

means forming a second surface adjacent each said element and spaced from said first surface a distance equal to the thickness of said record member for blocking fluid flow through a perforation at said predetermined areas of said first surfaces when a said record is present; and means for moving a said record column by column between said first and second surfaces.

4. Apparatus for translating and recording characters of a known group in which each character is represented by a unique arrangement of perforations at selected ones of predetermined index positions located in columns in a record member comprising, in combination:

a plurality of means each operable in response to a fluid signal to record a different one of said characters;

a plurality of decoding means each operatively connected to one of said recording means and having a decoding surface thereon for supporting a record member and having duct means therein for conveying fluid between inlet and outlet ports, each said duct means including at least a pair of ducts having one end of each duct of said pair terminating at a common area of said surface corresponding to one of said index positions so as to be effectively connected for continuous flow by a said perforation coincident with said area, and designated ones of said duct means further including at least one junction of ducts terminating at another area of said surface corresponding to another of said index positions for exhausting fluid to said surface when a perforation is coincident therewith to render said duct means discontinuous for fluid flow therein:

means forming a second surface for said decoding surfaces and spaced therefrom a distance equal to the thickness of said record member, said surface means being impervious to said fluid opposite said common areas and permitting flow of said fluid opposite said other areas; and means for moving a said record member between said surface column by column whereby said each decoding element is rendered effective to operate said recording means when perforations occur only at said common areas.

5. Apparatus for translating and recording characters of a known group in which each character is represented by a unique columnar arrangement of perforations in a record member comprising, in combination:

a plurality of record marking means each operable in response to fluid flow thereto for recording one of the characters of said group;

a decoding element for each said marking means and having a decoding surface thereon for receiving a said record member;

duct means for each said decoding element for conveying pressurized fluid from a source to one of said marking mean, said duct means comprising a plurality of channels serially arranged for termination at predetermined first areas of said decoding surface and adapted to be joined together when a perforation coincides therewith;

venting means formed in designated ones of said duct means and connected between said channels and predetermined second areas of said decoding surface for preventing said serial flow when a perforation coincides therewith;

movable first and second support surface means respectively opposite said first and second areas of said decoding surface and biased for movement toward said decoding surface, being displaceable therefrom by a said record member, said first surface means being adapted to prevent fluid flow through said perforation thereat and said second surface means being adapted to permit fluid flow through a perforation thereat; and means for moving said record member between the decoding surfaces of said decoding elements and said first and second surface means.

6. Apparatus for translating and recording characters of a known group in which each character is represented by a unique arrangement of perforations in a record member comprising, in combination:

first and second manifold means for supplying pressurized fluid;

a plurality of decoding elements each having a decoding surface thereon for receiving said members and a plurality of ducts therein, said ducts being arranged to convey fluid successively therethrough from said first manifold when connected, each said element including at least a pair of said ducts each having one end thereof terminating at a first predetermined area of said decoding surface and adapted to be connected by a said perforation at said area, and designated ones of said elements having another duct forming a junction with one duct of said pair substantially normal thereto with said junction being vented at a second predetermined area of said surface to discharge fluid from said duct plurality by a perforation at said second area;

means forming a surface opposite the decoding surfaces of said elements to prevent fluid flow through a said perforation at said first areas and permitting fluid flow through a said perforation at said second areas;

a plurality of record marking means each corresponding to one of said elements and operable in response to a fluid pressure signal for recording one of said characters on said record member;

valve means connected between each said element and the corresponding said recording means being displaceable in response to fluid flow from said element for connecting said corresponding recording means to said second manifold for actuation by fluid therein; and means for producing relative motion between said record member and said elements.

7. Apparatus for translating and recording characters of a known group in which each character is represented by a unique arrangement of perforations at selected ones of index positions located in columns in a record member comprising, in combination:

a plurality of means each operable to record a different one of said characters in response to a fluid pressure signal;

a plurality of decoding means each associated with one of said recording means and having a decoding surface thereon and fluid-conveying duct means formed therein and adapted, when connected, to convey a fluid from a pressure source to one of said recording means, each said duct means including at least a pair of serially arranged ducts having one end of each of said pair terminating at an area on said surface corresponding to a said index position, and designated ones of said decoding elements further including another duct forming substantially a T junction with one of said pair of ducts, and one of said junction ducts terminating singly at an area of said surface corresponding to another of said index positions;

means forming a surface spaced from said decoding surfaces a distance equal to the distance of said record member and being impervious to said fluid at all locations other than those opposite said areas where a duct terminates singly; and means for moving said record member between said surfaces column by column whereby each said decoding element provides a fluid pressure signal to its corresponding recording means when a perforation coincides with said areas having a pair of duct terminations and no perforation occurs at said areas where there is a single duct termination.

8. Apparatus for translating and recording a character represented by a predetermined arrangement of perforations in a column of data positions in a record member comprising, in combination:

recording means operable in response to pressurized fluid applied thereto for recording said character;

decoding means interconnected with a source of pressurized fluid and said recording means, said decoding means including a plurality of ducts each having a sensing port on a common surface of said decoding means with pairs of said ports being located in areas of said surface corresponding to the data positions of said character so as to be serially connected by the combination of perforations for directing said pressurized fluid to said recording means, at least one of said ducts having a vent opening therein connected with said surface at a data position different than the data positions for said sense ports for venting said pressurized fluid to atmosphere when a perforation occurs in conjunction with said predetermined arrangement;

blocking means spaced from said surface a distance equal to the thickness of said record member for preventing fluid flow through perforations in said predetermined arrangement; and means for moving said record member between said surface and said blocking means to bring any said perforations in said column of data positions adjacent said sensing ports and vent opening.

References Cited

UNITED STATES PATENTS

| | | | |
|---|---|---|---|
| 2,027,033 | 1/1936 | Ford | 235—61.11 |
| 2,053,063 | 9/1936 | Bryce | 101—93 |
| 2,056,394 | 10/1936 | Ford | 101—93 |
| 2,072,447 | 3/1937 | Gray | 101—93 |
| 2,227,141 | 12/1940 | Keinschmidt | 101—93 |
| 2,510,552 | 6/1960 | Carroll et al. | 235—61.11 |
| 2,900,130 | 8/1959 | Lambert | 235—61.11 |
| 2,979,255 | 4/1961 | Hubl | 235—61.11 |
| 3,226,530 | 12/1965 | Greenblot | 235—61.11 |

WILLIAM B. PENN, *Primary Examiner.*